United States Patent [19]
Wortberg et al.

[11] Patent Number: 4,889,477
[45] Date of Patent: Dec. 26, 1989

[54] EXTRUDER HEAD

[75] Inventors: Johannes Wortberg, Bochum; Paul B. Junk, Neunkirchen; Harry Franke, Bochum, all of Fed. Rep. of Germany

[73] Assignee: Battenfeld Fischer Blasformtechnik GmbH, Lohmar, Fed. Rep. of Germany

[21] Appl. No.: 330,934

[22] Filed: Mar. 23, 1989

Related U.S. Application Data

[63] Continuation of Ser. No. 907,490, Sep. 15, 1986, abandoned.

[30] Foreign Application Priority Data

Sep. 16, 1985 [DE] Fed. Rep. of Germany ....... 3532996

[51] Int. Cl.⁴ .................... B29C 47/06; B29C 47/20
[52] U.S. Cl. ............................ 425/133.1; 264/171; 425/376.1
[58] Field of Search ............... 264/171, 173; 425/113, 425/131.1, 131.5, 133.1, 376.1

[56] References Cited

U.S. PATENT DOCUMENTS

| | | | |
|---|---|---|---|
| 3,241,503 | 3/1966 | Schafer | 425/133.1 |
| 3,649,143 | 3/1972 | Papesh et al. | 425/133.1 |
| 3,801,429 | 4/1974 | Schrenk et al. | 264/171 |
| 3,968,307 | 7/1976 | Matsui et al. | 264/171 |
| 4,047,868 | 9/1977 | Kudo et al. | 264/173 |
| 4,167,383 | 9/1979 | Marakami et al. | 425/133.1 |
| 4,370,114 | 1/1983 | Okamoto et al. | 425/131.5 |
| 4,522,775 | 6/1985 | Briggs et al. | 425/133.1 |
| 4,578,025 | 3/1986 | Ando et al. | 425/133.1 |
| 4,657,497 | 4/1987 | Dehennau et al. | 425/133.1 |

FOREIGN PATENT DOCUMENTS

| | | | |
|---|---|---|---|
| 3044535 | 6/1982 | Fed. Rep. of Germany | 425/133.1 |
| 57-61524 | 4/1982 | Japan | 425/113 |

*Primary Examiner*—Jay H. Woo
*Assistant Examiner*—C. Scott Bushey
*Attorney, Agent, or Firm*—Toren, McGeady & Associates

[57] ABSTRACT

An extruder head for the extrusion of tubular preforms having single-layer or multiple-layer walls, from plastics material which has been plasticized in extruders. The extruder head utilizes the so-called coextrusion system. The extruder head includes a plurality of equal or similar head parts which can be optionally placed one behind the other and each have a central annular discharge and/or passage duct. Each of the head parts has at least one spirally extending distributor which leads via an annular gap to the discharge and/or passage duct. The ends of adjacent head parts facing one another have complementary engagement elements which are used to bring the discharge and/or passage ducts into axial alignment.

12 Claims, 4 Drawing Sheets

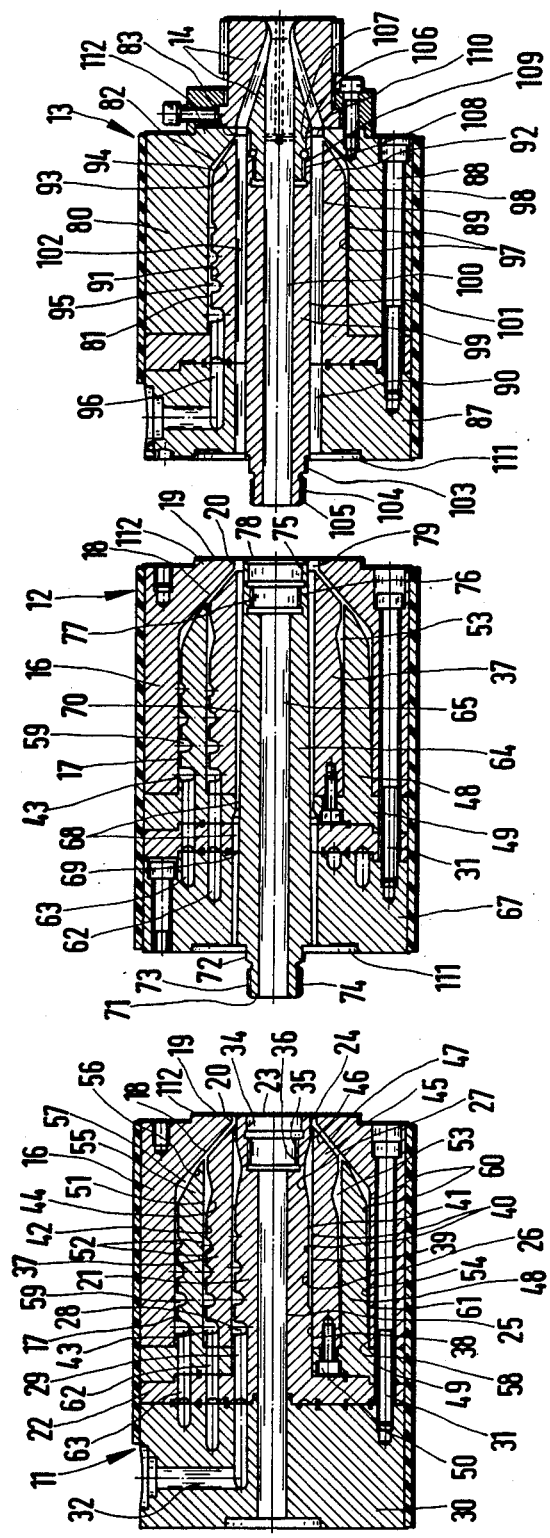

EXTRUDER HEAD

This is a continuation of Ser. No. 907,490 filed Sept. 15, 1986, abandoned.

BACKGROUND OF THE INVENTION

1. Field of the Invention

The invention relates to an extruder head for the extrusion of tubular preforms having single-layer or multiple-layer walls, from plastics material which has been plasticized in extruders.

2. Description of the Prior Art

It is known to manufacture single-layer or multiple-layer plastics containers by means of blow molding from tubular preforms which are extruded by means of so-called extruder heads from plastics material which has been plasticized in extruders.

While the manufacture of preforms for containers having single-layer walls poses no problems at all, it had in the past been frequently difficult to extrude preforms having multiple-layer walls in such a way that the preforms can be used for manufacturing by blow molding plastics containers having faultless properties.

If in extruding preforms having multiple-layer walls, all these layers are formed concentrically relative to one another approximately in the same plane, the outermost layers are initially extruded with a very large diameter and must then be compressed by the influence of elastic circumferential deformations to reach the later tube diameter, while the innermost layer having the smallest diameter in the distribution system is subjected to a much smaller circumferential deformation because its diameter does not have to be changed substantially. Thus, particularly when different types of plastics materials are to be extruded in a laminar structure, it frequently happens that the layers poorly adhere to one another and the finished articles have poor properties with respect to resistance to compression and/or impact strength.

Another disadvantage is the fact that the individual extruder heads have relatively large diameters, so that these extruder heads can only with difficulty be operated next to one another as multiple extruder heads.

In order to avoid these disadvantages it is possible to place one behind the other the distribution systems in the extruder head for obtaining the individual wall layers. However, this arrangement means that the structural length of the extruder head substantially varies in dependence upon the number of wall layers to be formed, and that excessively long flow distances for the plastics material in the individual layers are required.

Thus, while the type of extruder head described first leads to extreme variations of the relative diameters of the individual layers, in the case of the second type of extruder head there exist extreme variations with respect to flow times, dwell times and shearing stresses of the individual layers.

It is, therefore, the primary object of the present invention to avoid the disadvantages of the known types of extruder heads.

It is specifically the object of the invention to provide an extruder head of the above-mentioned type in which small diameter variations between the individual layers are possible, while undesirably long flow distances and overall dimensions of the extruder head are avoided.

SUMMARY OF THE INVENTION

In accordance with the present invention, the extruder head includes a plurality of equal or similar head parts which can be optionally placed one behind the other and each have a central annular discharge and/or passage duct. Each of the head parts has at least one spirally extending distributor which leads via an annular gap to the discharge and/or passage duct. The ends of adjacent head parts facing one another have complementary engagement elements which are used to bring the discharge and/or passage ducts into axial alignment.

Since certain common flow path lengths of adjacent plastics material layers may be advantageous with respect to the best possible connection or welding, the above-described extrusion head makes it possible to meet the most varied requirements.

In accordance with another feature of the invention, each head part has up to three concentrically arranged spirally extending distributors which are arranged concentrically one within the other and all lead into the discharge and/or passage duct of the head part in which they are arranged. Thus, a single head part of relatively short length makes possible the extrusion of preforms which have a single-layer to three-layer wall. Two head parts arranged one behind the other make possible the manufacture of preforms having two to six wall layers, while the use of three head parts arranged one behind the other permits the manufacture of preforms which have between three and nine wall layers.

Accordingly, by using different combinations of head parts, the most varied requirements can be met relatively easily.

In accordance with another important feature of the invention, each head part has an end piece which contains connecting and supply ducts for the plasticized plastics material. The number of connecting and supply ducts corresponds to the number of spiral distributors contained in the head part.

These end pieces can be connected, angularly offset in circumferential direction, to the extruders supplying the different plastics materials.

In many cases it may be useful to utilize between two equal or similar head parts a head part which contains merely a passage duct, so that a common flow path for already laminated melt layers is provided and the adherence between the layers is improved.

In accordance with another feature of the present invention, it is possible to provide in front of the discharge nozzle of the extruder head an extruder part which has only a passage duct, so that a common flow path is provided for all laminated melt layers.

In accordance with a particularly advantageous embodiment of the invention, up to three equal or similar head parts are arranged one behind the other, wherein each head part contains at least one spiral distributor. The overall length of the extruder head only slightly exceeds three times the diameter. However, such an extruder head makes possible the extrusion of preforms which have up to nine superimposed wall layers.

It has also been found useful in certain cases if the number of spiral distributors decreases in the individual head parts toward the discharge nozzle. This type of arrangement leads to rheological and thermodynamic advantages.

Moreover, it is possible to install the spiral distributors in such a way that they are thermally separated from the head part and/or each other. The spiral distributors may be provided with or connected to temperature control devices which are independent from each other. In this way, it is possible to obtain different temperatures of the individual melt flows advanced through the individual spiral distributors, so that the different plastics materials to be processed can be influenced in an optimum manner. It may be useful, for example, to feed the plastics materials at very different temperatures from the extruders into the extruder head and to maintain these temperatures during the material distribution in the extruder head and to permit a temperature compensation only once the laminated extruder material has been reached.

The spiral distributors may be formed by sleeves which have at the outer surface a slightly conical outer portion of great length and a steeply conical end portion of short length, while the inner surface is cylindrical along the entire length.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawing:

FIG. 5 is a sectional view of the three head parts of the extruder head of FIG. 1, the head parts shown in the separated state.

DETAILED DESCRIPTION OF THE INVENTION

Figure 1:
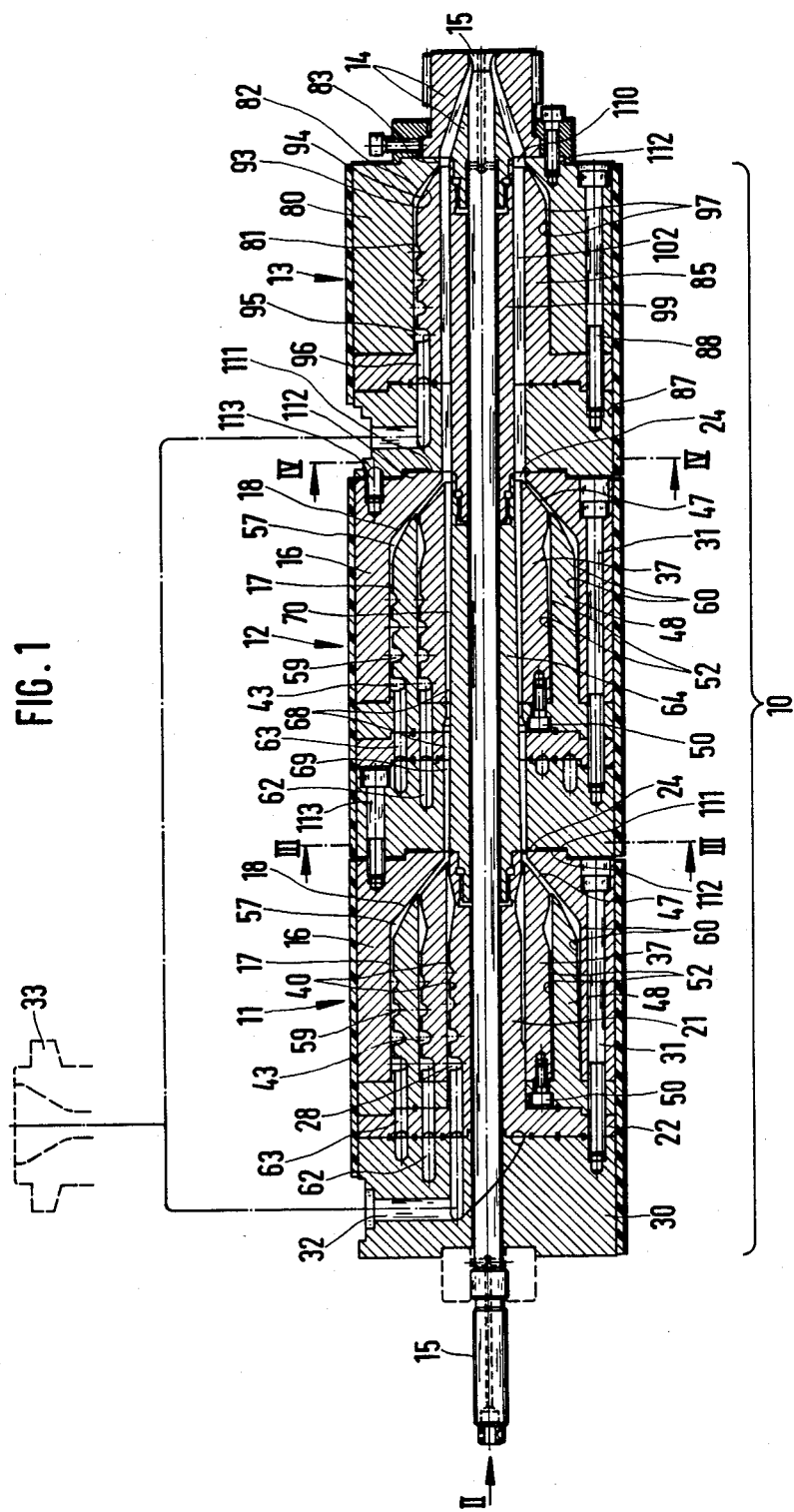
FIG. 1 is a sectional view of an extruder head according to the invention, composed of three similar head parts.
Figure 4:
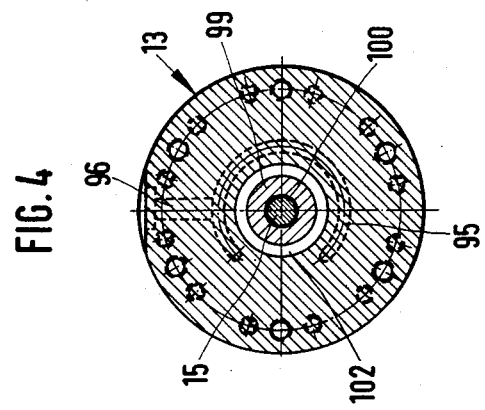
FIG. 4 is a sectional view of the extruder head of FIG. 3, taken along sectional line IV—IV.
Figure 3:
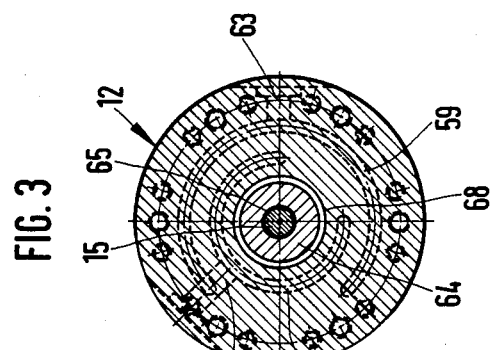
FIG. 3 is a sectional view of the extruder head of FIG. 1, taken along sectional line III—III.

FIG. 1 of the drawing is a longitudinal sectional view of an extruder head 10 for the extrusion of tubular preforms. The extruder head 10, as illustrated in FIG. 1, includes three similar head parts 11, 12 and 13 which are arranged one behind the other in axial alignment. A discharge nozzle 14 is attached to the front end of head part 13 of extruder head 10. A nozzle pin 15 extends coaxially through inner cylindrical ducts formed in all three head parts 11, 12 and 13 and can be actuated at the rearward end of head part 11.

All three head parts 11, 12 and 13 of extruder head 10 are structurally essentially the same.

Head part 11 has a casing 16 which over the greatest portion of its length is provided with a cylindrical internal surface 17, while at its forward end it has a conically narrowing portion 18. The conically narrowing portion 18 ends at end face 19 of jacket 16 in a central orifice 20, as can be seen in FIG. 5.

A sleeve member 21 is coaxially inserted in casing 16 from the rearward end of the head part 11. Sleeve member 21 has at its rear a support flange 22. The free other end 23 of sleeve member 21 ends at least approximately flush with the end face 19 of casing 16 and, thus, together with orifice 20 of casing 16, defines an annular discharge duct 24.

Sleeve 21 has a central axially extending hole 25 for nozzle pin 15. At its outer periphery, sleeve 21 has extending over the greatest part of its length toward free end 23 a slightly conically narrowing surface portion 26 which, in turn, closely adjacent to free end 23, has a reduced diameter portion 27.

Surface 26 of sleeve 21 has formed in it spirally extending melt ducts 28 which are in communication with a melt supply duct 29 which extends parallel to the longitudinal axis of sleeve 21. Ducts 28 have varying depths. Thus, as can be clearly seen in FIGS. 1 and 5, the depth of melt ducts 28 steadily decreases in the direction from support flange 22 of sleeve 21 toward the free end 23 of sleeve 21.

Support flange 22 of sleeve 21 is releasably connected together with an end piece 30 by means of screws 31 to casing 16 in such a way that the supply duct 29 for the melt leads into a connecting duct 32 which opens to the side at end piece 30 and forms the connection for an extruder.

At the free end 23 of sleeve 21, increased diameter portions 34 and 35 relative to the diameter of axially extending wall 25 are formed, wherein increased diameter portion 34 has smooth contact surfaces, while the other increase diameter portion 35 has an internal thread 36.

The part of sleeve 21 extending away from support flange 22 is coaxially surrounded by another sleeve 37 which is centered on the rearward cylindrical surface portion 38 and has over its entire length a cylindrical inner surface 39.

Together with the slightly conical outer surface 26 of sleeve 21, the cylindrical inner surface 39 of sleeve 37 forms a so-called spirally extending distributor 40 which defines an annular passage duct 41 for the melt within which the movement of the melt is gradually changed from the so-called spiral flow in the region of the melt ducts 28 into an axial flow at the free end 23 of head part 11.

Outer surface 42 of second sleeve 37 has a similar shape as outer surface 26 of first sleeve 21. Thus, outer surface 42 slightly conically narrows toward the free end, has in its rearward portion melt ducts 43 whose depths steadily decrease in the direction from the rear toward the front and has in the vicinity of its free end a reduced diameter portion 44.

Contrary to sleeve 21, sleeve 37 has at its free end a steeply conically narrowing end portion 45 whose outer surface 46 is located adjacent to the conical inner surface 18 of casing 16 so as to form a conical annular duct 47.

Second sleeve 37 is concentrically surrounded by a third sleeve 48 which projects from a support flange 49 by means of which the second sleeve 37 is releasably connected through screws 50 and through which the third sleeve 48 through screws 31 is connected with the casing 16 and the end piece 30.

Third sleeve 48 again has almost along its entire length a cylindrical inner surface 51. Together with conical outer surface 42 of second sleeve 37, inner surface 51 forms a spirally extending distributor 52 which includes an annular melt duct 53 within which the original spiral flow is changed over into an axial flow before the melt reaches the conical annular gap 47 and is moved in the direction toward the discharge duct 24.

Outer surface 54 of third sleeve 48 also has over the greatest portion of its length in the direction toward the free end a slightly conically narrowing shape and it also has at its free end a steeply conically narrowing end portion 55 whose outer surface 56 is located opposite conical narrowing portion 18 of casing 16 so as to form a spacing gap 57. However, in the vicinity of support flange 49, third sleeve 48 has a cylindrical surface portion 58 which for proper centering extends along cylindrical inner surface of casing 16.

Outer surface 54 of third sleeve 48 also has formed in it melt ducts 59 whose depths steadily decrease in the direction toward the free end, wherein the outer surface 54 interacts with the cylindrical inner surface 17 of casing 16 to form a so-called spirally extending distributor 60. Distributor 60 has in the direction toward the free end a conically expanding annular gap within which the spiral flow of the melt gradually is changed into an axial flow before flowing through gap 57 and gap 47 into the range of annular discharge duct 24.

Figure 2:
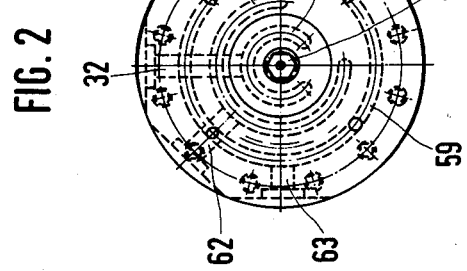
FIG. 2 is a side elevational view of the extruder head of FIG. 1, seen in direction of arrow II.

It should also be mentioned that the melt ducts 43 of the second sleeve 37 are in communication with a supply duct 62 which extends from sleeve 37 through support flange 49 and support flange 22 into end piece 30 and opens to the side in end piece 30, as can be seen in FIG. 2.

A similar supply duct 63 for the melt is also provided for the melt ducts 59 in third sleeve 48, as can be clearly seen in FIGS. 1 and 2.

With respect to casing 16 and the two sleeves 37 and 48, head part 12 of extruder head 10 is constructed practically in the same way as head part 11.

Head part 12 differs from head part 11 in that head part 12 contains an inner sleeve 64 with a central passage duct 65 for nozzle pin 15 which is constructed and arranged differently than sleeve 21 in head part 11.

Sleeve 64 is arranged in head part 12 with a loose fit relative to the other structural parts, so that it can be moved coaxially through sleeve 36 and through end piece 67 of head part 12. Sleeve 64 defines between its outer circumference, the inner surface of sleeve 37 and a passage in end piece 67, an annular passage duct 68 for the melt strand arriving from discharge duct 24 of head part 11. Passage duct 68 has two radially stepped longitudinal portions 69 and 70 which each slightly conically widens in flow direction of the melt strand as a result of the shape of the outer surface of sleeve 64.

The rearward end 71 of sleeve 64 projects out of the rearward end of end piece 67 and is provided with radially stepped portions 72 and 73. While portion 72 has a smooth surface, so that it can correspond with the smooth surface 34 in sleeve 21, portion 73 has an external thread 74 which corresponds to internal thread 36 in sleeve 21 of head part 11.

The other end of sleeve 64 has a shape which corresponds to the free end of sleeve 21 of head part 11. Thus, sleeve 64 has a shape which corresponds to the free end of sleeve 21 of head part 11. Thus, sleeve 64 has at the end of central passage 65 two step-like increased diameter portions 75 and 76, of which portion 75 has smooth surfaces while portion 76 has an internal thread 77. The outer surface of sleeve 64 defines at the free end 78 of the sleeve an annular discharge duct 79 for the melt with the end portion 20 of casing 16. The annular gap 57, 47 formed between the conical inner surface 18 of casing 16 and the conical end portions 55 and 45 of the two sleeves 48 and 37 leads from radially outwardly into duct 79.

Head part 13 of extruder head 10 shown in FIG. 1 includes a casing 80 whose inner surface forms a cylindrical main portion 81 and a conical end portion 82 which leads into an orifice 83 at free end 84. A sleeve 85 is inserted into casing 80 from the rearward end. Sleeve 85 has a support flange 86 which is connected together with an end piece 87 through screws 88 to casing 80.

Sleeve 85 has a cylindrical passage 90 which is followed by a corresponding cylindrical passage 89 in end piece 87.

The outer surface of sleeve 85 has a slightly conically narrowing surface portion 91 which is followed by a steeply conical end portion 92 whose outer surface 93 is located opposite the conical surface 82 in casing 80 so as to form an annular gap 94. Conical annular gap 94 leads directly into orifice 83. Conical surface portion 91 of sleeve 85 has formed therein a melt duct 95 the depth of which steadily decreases in the direction toward the free sleeve end, as clearly shown in FIGS. 1 and 5. Melt from an extruder is supplied to melt duct 95 through a connecting duct 96. For this purpose, connecting duct 96 extends through support flange 86 and end piece 87. The connecting duct leads to the outside in end piece 87. Inner surface 81 of casing 80 and outer surface of sleeve 85 form together a spirally extending distributor 97 for the melt which includes an annular gap 98 which conically widens in flow direction and in which the melt flow is gradually changed from a spiral flow into an axial flow before reaching through conical annular gap 94 the orifice 83. Another sleeve 99 is provided concentrically to sleeve 85 in head part 13. Sleeve 99 has a cylindrical passage 100 with a smooth surface for the nozzle pin 15 and a cylindrical outer surface 101. Cylindrical inner surface 89 of sleeve 85 and cylindrical outer surface 101 of sleeve 99 define an annular cylindrical passage duct 102 which continues into end piece 87.

The rearward end of sleeve 99 projects out of the rearward end of end piece 87 and has radially stepped portions 103 and 104. Portion 103 has a smooth surface, while portion 104 has an external thread 105.

As in the screw connection of sleeve 64 of head part 12 to sleeve 21 of head part 11, sleeve 99 of head part 13 can also be connected to sleeve 64 of head part 12, as illustrated in FIG. 1.

The forward end 106 of sleeve 99 has increased diameter portions 107 and 108 as compared to passage 100, wherein portion 107 has a smooth surface, while portion 108 has an internal thread 109.

The forward end 106 of sleeve 99 is located at least approximately in the same plane as free end 84 of head part 13 and, together with orifice 83, defines an annular discharge duct 110, wherein conical annular gap 94 leads from radially outwardly into duct 110.

As illustrated in FIG. 1, head part 11 of extruder head 10 permits the manufacture of a three-layer tubular preform.

As illustrated in FIG. 1, head part 12 of extruder head 10 makes it possible to place two additional melt layers onto the melt strand supplied from head part 11. The head part 13 of extruder head 10 illustrated in FIG. 1, in turn, places an additional melt layer onto the melt strand supplied from head part 12.

The head parts 11, 12 and 13 of extruder head 10 illustrated in FIG. 5 are each capable when used alone to manufacture tubular preforms of plasticized plastics material having single-layer or multiple-layer walls.

For example, when used alone, head part 11 together with a discharge nozzle 14 will produce a preform having a three-layer wall.

When used alone, head part 12 together with a discharge nozzle 14 is capable of the manufacture of a preform having a wall with only two layers.

Finally, when used alone, head part 13 together with a discharge nozzle 14 will produce a preform having a single-layer wall.

By arranging the head parts 11, 12 and 13 one behind the other axially and connecting them to form an extruder head 10, preforms having six-layer walls can be manufactured.

A seven-layer wall could be obtained if a head part 11 were combined with two head parts 12 to form an extruder head 10.

A preform having a four-layer wall would be achieved if an extruder head 10 were formed by a head part 11 and a head part 13.

To make it possible to easily connect the individual head parts 11, 12 and 13 in the desired manner, so that preforms having the desired amount of layers are obtained, the ends of adjacent head parts to be connected are provided with complementary engagement elements.

The engagement elements are, for example, recesses 111 formed in the rearward ends and projections 112 formed at the other ends of the head parts 11, 12 and 13. As shown in FIG. 1, recesses 111 and projections 112 are placed in axial alignment, so that discharge ducts 24 and/or passage ducts 68 and 102 of all adjacent head parts 11, 12 and 13 are corresponding with one another for a correct operation. The individual head parts 11, 12 and 13 of an extruder head 10 are held together by means of releasable screw connections 113, as they are shown, for example, in FIG. 1 of the drawing.

Discharge nozzle 14 shown in FIGS. 1 and 5 also has a shape which permits a problem-free coupling to each projection 112 of head parts 11, 12 and 13.

As is apparent from FIGS. 1 and 5 of the drawing, sleeves 21, 37 and 48, 37 and 48,85 defining the individual spirally extending distributors can be assembled and mounted independently from each other. Therefore, it is easily possible to mount the various spirally extending distributors thermally separately from each head part 11, 12 and 13 and/or from each other. Also, the distributors can be provided with or connected to heating devices which are independent from one another.

As a result, plastics material having very different temperatures as they are supplied from the extruders can be fed into the extruder head 10. Also, these temperatures can be maintained during the material distribution within the extruder head 10, while a temperature compensation takes place only once the laminated extruded material is formed.

Accordingly, it is possible in a relatively simple technical manner to manufacture preforms whose walls have very different layer compositions.

Figure 6:
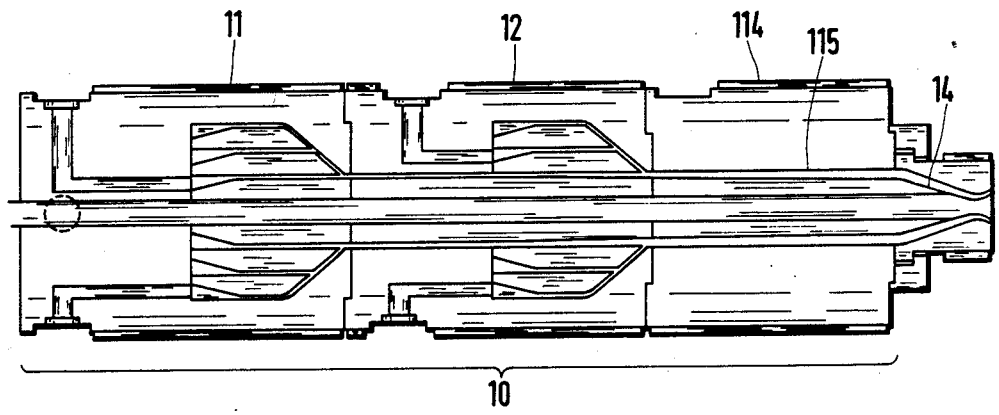
FIGS. 6 and 7 are schematic sectional views of different embodiments of the extruder head according to the invention.

FIG. 6 of the drawings is a schematic illustration of an extruder head 10 which includes a head part 11 and a head part 12, however, between head part 12 and discharge nozzle 14 there is arranged another head part 114 which contains only a passage duct 115 for the tubular melt strand having a five-layer wall as it leaves extruder head 12. In this way, all laminated melt layers must travel a predetermined common flow path before they reach discharge nozzle 14 for forming the extruded material.

Figure 7:
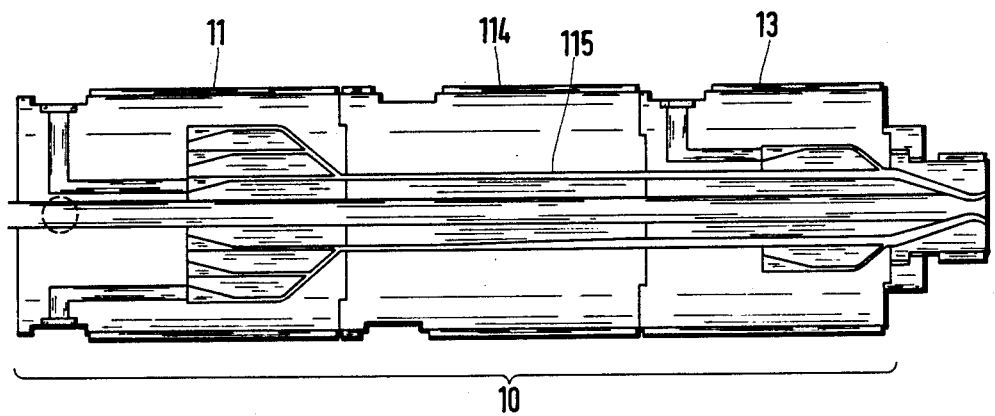

In the embodiment of an extruder 10 as illustrated in FIG. 7, a head part 114 having a single passage duct 115 is mounted between a head part 11 and a head part 13. Consequently, the extruder head 10 illustrated in FIG. 7 makes possible the manufacture of a preform whose wall has four layers, wherein the three wall layers formed in head part 11 are first forced to travel through a common flow path of predetermined length before the fourth and last melt layer is laminated onto the preform.

The above-described extruder heads 10 formed with head parts 11, 12 and 13 and 114 make possible the manufacture of tubular preforms of plastics material on the basis of so-called coextrusion, wherein the preforms may have a variety of wall compositions. It should be noted that the extruder heads 10 formed in accordance with the present invention have a relatively small diameter and also a relatively short structural length.

While specific embodiments of the invention have been shown and described in detail to illustrate the application of the inventive principles, it will be understood that the invention may be embodied otherwise without departing from such principles.

We claim:

1. An extruder head for the extrusion of tubular preforms having single-layer or multiple-layer walls, from plastics material melt which has been plasticized in extruders, the extruder head having an axis and a front end, comprising a plurality of head parts each capable of being used individually as a complete and operational unit or arranged one behind the other in any desired combination in axial direction of the extruder head and having a central annular duct extending in the axial direction, each annular duct defined by an outer surface of a sleeve and by an inner surface of a casing of the head part, each head part defining an inner cylindrical duct, a nozzle pin extending through the inner cylindrical duct of the extruder head, a discharge nozzle connected to the nozzle pin at the front end of the extruder head, each sleeve having first and second ends and each casing having first and second ends, engagement elements mounted on each first and second end of each sleeve and each first and second end of each casing, the engagement elements on the first ends of the sleeves being constructed so as to complement the engagement elements on the second ends of the sleeves and the engagement elements on the first ends of the casings being constructed so as to complement the engagement elements on the second ends of the casings, the discharge nozzle having engagement elements coupleable to the engagement elements on the ends of the sleeves and casing of the head part adjacent to the discharge nozzle, and the engagement elements on the second ends of the sleeve and the casing of one head part being coupleable to the engagement element on the first ends of the sleeves and casing of the next adjacent head part, the engagement elements acting to connect the sleeves and casings to one another in such a way that the central annular ducts of the head parts are in axial alignment, wherein each head part defines at least one spirally extending distributor means spaced radially from the central annular duct for effecting spiral flow of the melt through the head parts, and wherein each head part has an annular gap formed downstream of the distributor means for permitting flow of the plasticized plastics material from the distributor means to the central annular duct, whereby a desired single-layer or multiple-layer wall composition of the preforms is obtained by axially aligning one or more of the head parts and connecting the complementing engagement elements of head parts arranged immediately next to each other.

2. The extruder head according to claim 1, wherein the extruder head includes three head parts each having up to three concentrically arranged distributor means.

3. The extruder head according to claim 1, wherein each head part comprises an end piece forming the upstream end portion of the head piece, each end piece defining supply ducts for the melt corresponding in number to the number of distributor means in each head part.

4. The extruder head according to claim 1, comprising two head parts and a further head part having only a central annular gap.

5. The extruder head according to claim 1, comprising a further head part having only a central annular gap, the further head part connected downstream of the plurality of head parts.

6. The extruder head according to claim 1, comprising up to three head parts each having at least one distributor means.

7. The extruder head according to claim 1, wherein the number of distributor means in each head part decreases from head part to head part in flow direction of the melt.

8. The extruder head according to claim 1, wherein the distributor means in each head part are thermally separated from the head part.

9. The extruder head according to claim 1, wherein the distributor means of each head part are thermally separated from one another.

10. The extruder head according to claim 1, wherein the distributor means in each head part are each connected to heating devices which are independent from one another.

11. The extruder head according to claim 1, wherein the distributor means are formed by spirally extending grooves defined in the outer surfaces of concentrically arranged sleeves, wherein the outer surfaces of the sleeves have a slightly conically inclined main portion of great length and a steeply conically inclined end portion of short length, the inner surfaces of the sleeves are cylindrical along their entire lengths.

12. Extruder head according to claim 1, wherein each head part comprises a central sleeve, a nozzle pin extending through the central sleeves of the head parts, and wherein the sleeves of adjacent head parts are connectible to one another by means of thread connections.

* * * * *